Aug. 4, 1959  P. S. WILLIAMS  2,898,394
DEFERRED ACTION BATTERIES
Filed April 29, 1944  2 Sheets-Sheet 1
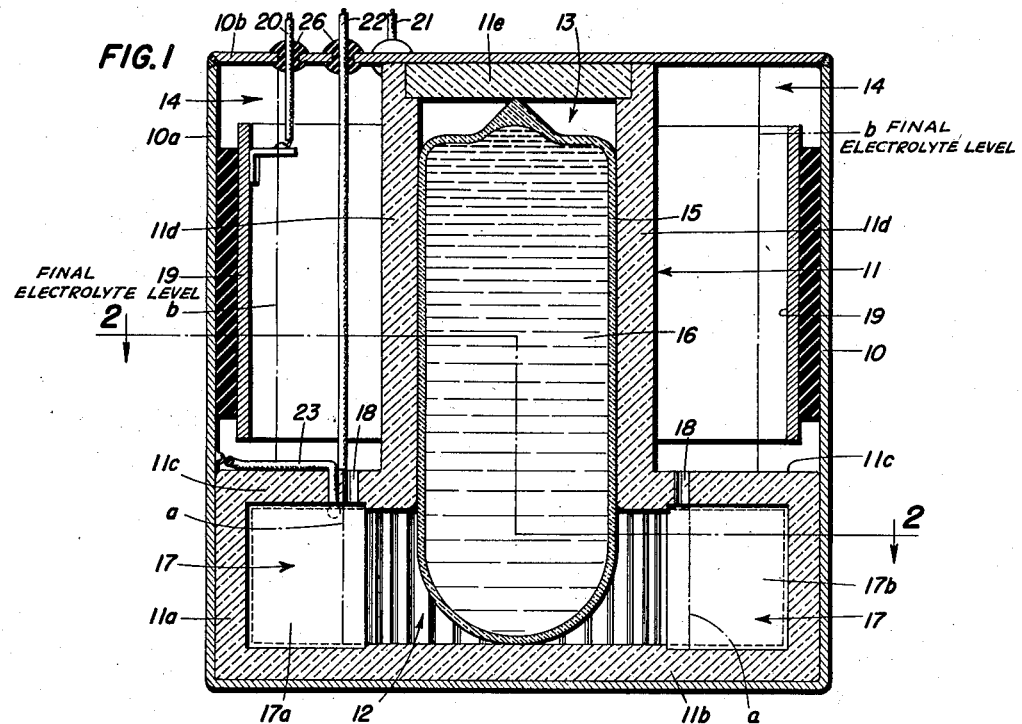
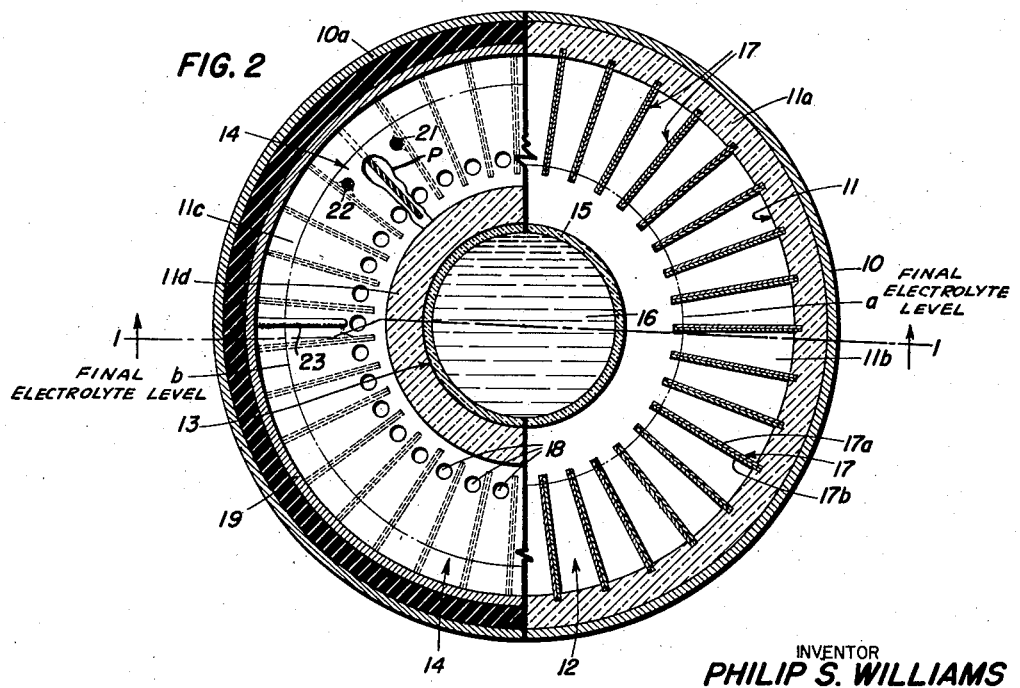
INVENTOR
PHILIP S. WILLIAMS
BY
ATTORNEY Aug. 4, 1959　　　P. S. WILLIAMS　　　2,898,394
DEFERRED ACTION BATTERIES
Filed April 29, 1944　　　2 Sheets-Sheet 2
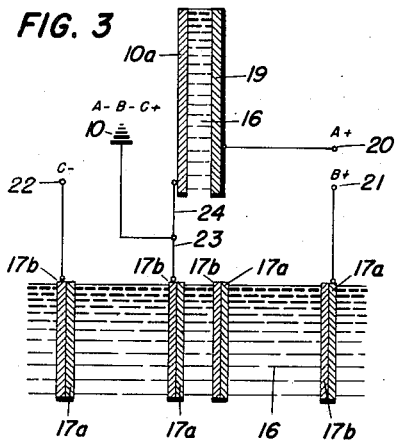
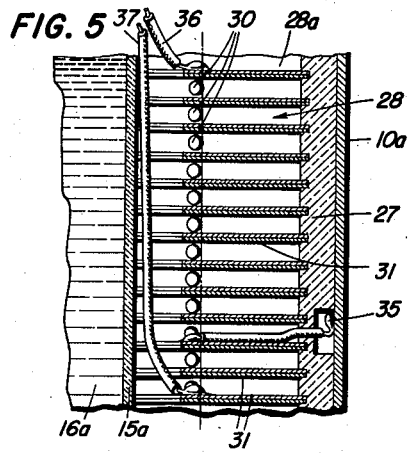
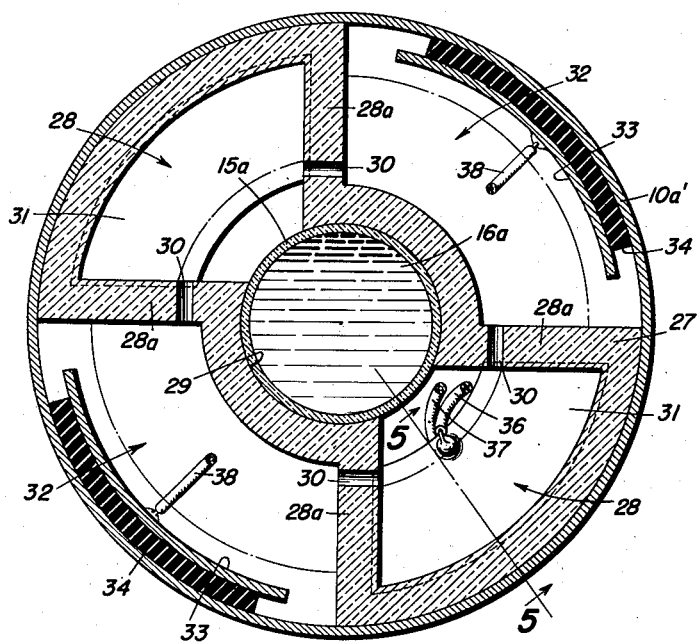
INVENTOR
PHILIP S. WILLIAMS
BY
ATTORNEY United States Patent Office 2,898,394
Patented Aug. 4, 1959

2,898,394

DEFERRED ACTION BATTERIES

Philip S. Williams, Tulsa, Okla., assignor to the United States of America as represented by the Secretary of the Navy Application April 29, 1944, Serial No. 533,372

10 Claims. (Cl. 136—90)

This invention relates generally to galvanic batteries and more particularly to a new deferred action battery for use with electrically operable projectile fuzes.

In a projectile employing an electrically operable fuze, it is necessary to provide a battery which can be confined within the projectile for an indefinite period and yet which will be capable of supplying the required voltages necessary to operate the fuze when needed.

The present invention provides such a battery which comprises generally a cylindrical body or casing of metal which contains dual diametrally dimensioned forms or chambers of insulating material and which has mounted axially thereof an ampoule of frangible material containing an electrolyte. Electrodes are molded into the larger diametrally dimensioned form or chamber, said electrodes being equally spaced and radially surrounding a part of the ampoule, said electrodes providing a current source for B—C voltages. A single electrode is provided to coact with the casing to constitute the "A" current source, and is mounted within an annular chamber surrounding the smaller diametrally dimensioned form. Numerous small holes affording communication between the annular chamber or "A" cell and the larger diametrally dimensioned chamber or B—C cell, provide means for the distribution of the electrolyte when it is released.

When the battery is embodied in the fuze of an explosive projectile the liquid electrolyte is released under force of set-back created in the projectile when the later is fired from a gun, and then the released electrolyte is uniformly distributed to the electrodes under centrifugal force created by the spinning projectile. The primary object of the invention is to provide a battery having a multiple voltage source and adapted for this purpose, which is comparatively small and compact in the arrangement of its parts, and which is capable of quick activation with a low internal electrical leakage.

A further object is to provide a battery for an electrically operable projectile fuze which will remain electrically inactive until acted upon by setback and centrifugal force, in the order named, to release and distribute an electrolyte for activating said battery, concurrently arming said projectile.

A still further object of the invention is to provide a battery which is compact and simple in construction, and which will be highly efficient in operation.

Other objects not mentioned will become evident as the description proceeds.

In order that the invention may be clearly understood and readily carried into effect, the same will be more fully described with reference to the accompanying drawings, in which Fig. 1 is an axial sectional view of the battery showing the ampoule intact;

Fig. 2 is a transverse section taken along the line 2—2 of Fig. 1;

Fig. 3 is a diagrammatic view showing the circuits of the triple voltage battery;

Fig. 4 is a transverse sectional view of another embodiment of the invention, and Fig. 5 is a fragmentary sectional view taken along the line 5—5 of Fig. 4.

In the drawings, wherein like numerals designate identical parts throughout the various views, reference is first made to Figs. 1 and 2 wherein numeral 10 designates the main body or casing of a deferred action type battery for a projectile. Fitted into this casing, which is of zinc or other suitable metal, is a form 11 constructed preferably of plastic or other suitable insulating material. This form comprises two communicating spaces 12 and 13, the larger chamber or compartment 12 being defined by the cylindrical wall 11a, a transverse or inner end wall 11b and an intermediate wall 11c, while the smaller central chamber or well 13 is defined by the cylindrical wall 11d and the forward end wall 11e. A secondary chamber 14, which is of annular shape, is formed when the battery is completely assembled, said chamber being defined by the walls 10a and 10b of the casing 10 and the walls 11c and 11d of the form 11. The purpose of the chamber 14 will hereinafter be explained.

An ampoule 15 of frangible material as glass and containing a liquid electrolyte 16 such as a solution of sulphuric acid in water is housed within the walls of the chamber 13 and extends rearwardly into the communicating compartment 12 where it is confronted by the electrodes 17. The volume of the electrolyte contained within the ampoule 15 is of a fixed value in order that there will be a sufficient amount to activate all cells without causing internal leakage.

It should be understood that the battery is installed within the projectile so that the axis of said battery and the axis of rotation of the projectile will approximately coincide, as this is essential for the intended mode of operation of the battery.

The equally spaced electrodes 17, which are of bimetal, are molded into the walls 11a, 11b, 11c of the chamber 12 and radially surround the ampoule 15. This series of composite electrodes 17, with insulated electrolyte spaces, forms a bi-polar battery whose cell voltages are additive.

A series of holes 18 in the wall 11c, spaced intermediately of the electrodes 17 and all equi-distant from the axis of rotation, provides a means of communication between the compartment 12 or B—C battery container and the secondary chamber 14 or A cell. Mounted within the annular chamber 14 and insulated from the metal casing 10 is a single iron electrode 19. This electrode is the positive electrode for the "A" current source, the zinc casing 10 being the negative electrode.

Referring again to the electrodes 17, it will be observed that each comprises a negative element 17a, preferably of zinc, and a positive element 17b of lead with lead dioxide on lead, which are so mounted that the negative element of each electrode faces the positive element of its adjacent electrode.

As shown in Figs. 1 to 3, suitable conductors are provided, the positive "A" and "B" terminals 20 and 21, respectively, being tapped from the elements 17a and 19 while the negative "C" terminal 22 is tapped from one of the elements 17b. The negative "A" and "B" and positive "C" conductors 23 and 24, respectively, are commonly grounded to the casing 10. To prevent short circuiting by the electrolyte between positive B and negative C, one cell is blocked, as by a radially extending plate or partition P of insulating material located between the positive terminal 21 and terminal 22, as indicated in Figs. 1 and 2, the latter figure being broken away for this disclosure. It is obvious that desired voltages may be obtained by varying the number of electrodes. Rubber grommets 26 maintain a seal between the casing 10 and the conductors for preventing escape of the electrolyte, when released.

The operation of the invention will now be briefly described. When a projectile containing a battery of the type just described is fired from a rifled gun, the frangible ampoule 15 is distintegrated by the setback force, thus releasing the electrolyte which fills the chamber 12 to overflowing. Concurrently with and also subsequent to the setback action, the centrifugal force incident to rotation of the projectile acts to squeeze through the holes 18 and into the secondary chamber 14, that excess of electrolyte building up toward the axis of the battery beyond the holes 18, said electrolyte assuming the "levels," actually cylindrical surfaces, indicated by the chain lines $a$ and $b$ in the chambers 12 and 14.

Due to the positioning of the concentric holes 18, the final level assumed by the electrolyte 16, in the chamber 12, as indicated by the chain line $a$, is a substantial distance back from the inner ends of the electrodes 17. Also, it will be noted that the final electrolytic level within the secondary chamber 14 is definitely out of alignment with that of chamber 12. This segregation of the fluids prevents internal electrical leakage when the fluid distribution is completed, except through that thin film of electrolyte which may adhere to the surface of the insulating members. Since both the filling of the chambers 12, 14 and equalization of the electrolyte therein occur substantially simultaneously, the whole process can take place in a very short time. Further, the absence of internal leakage should permit use of comparatively small plate areas, leading to a small overall size.

The modified form of the invention shown in Figs. 4 and 5 comprises a zinc casing 10a which houses an insulating form 27 preferably made of plastic material. This form comprises two diametrally opposed segmental cell chambers or compartments 28 extending longitudinally of said form and communicating with an axial or intermediate chamber or well 29. The compartments 28 have side walls 28a provided with equally spaced bores or openings 30 for the purpose of distributing the electrolyte 16a. The electrolyte is confined by the ampoule 15a which is of frangible material and is located within the well 29.

Arranged laterally and coaxially of the form 27, and preferably secured in place by molding, are bi-metallic electrodes 31, said electrodes being equally spaced intermediately of the holes 30, as will be observed by reference to Fig. 5. Secondary chambers 32 which are formed by the insertion of the form 27 into the casing 10a, have mounted therein iron positive electrodes 33. These electrodes are insulated from the casing 10a by the insulating members 34. As in the preceding form, the electrodes 31 are grounded to the casing as at 35 (Fig. 5). Suitable leads 36, 37 and 38 connect the electrode elements with terminals externally of the casing for connection with the electrically operable fuze.

The operation of this form is substantially the same as that of the previously described form. When a projectile containing a battery of this type is fired from a gun, the ampoule 15a is crushed by the force of setback, releasing the electrolyte 16a which is forced by centrifugal action to the outer walls of the form 27, filling the B—C cells to overflowing. The excess electrolyte drains through the openings 30 into the secondary chambers 32 where it assumes the level indicated by the dot and dash line, so that the battery is activated.

It will be evident that the new battery is simple and compact and includes means for quickly and efficiently distributing the electrolyte under centrifugal force throughout the cells so as to obtain complete activation.

What is claimed is:

1. A battery subject to setback and centrifugal forces, comprising a casing, an insulating form defining a small diameter chamber and a communicating large diameter chamber, the form being fitted in said casing to define a secondary chamber between the wall of the small diameter chamber and the wall of the casing, an electrode in said secondary chamber, electrodes mounted radially in the large diameter chamber of said form, each electrode comprising an anode and a cathode plate, a frangible ampoule mounted in the small diameter chamber and extending into the large diameter chamber, an electrolyte in said ampoule, and means for conducting said electrolyte under the influence of centrifugal force from the large diameter chamber into said secondary chamber when liberated into the large diameter chamber from the ampoule.

2. A battery subject to setback and centrifugal forces, comprising a casing, an insulating form of dual diametrical dimensions defining two chambers, correspondingly of different diameters, the form being fitted in the casing and forming a secondary chamber between the wall of the smaller diameter chamber and the wall of the casing, electrodes mounted radially in the larger chamber of said form, the inner and outer ends of the electrodes being disposed in substantially concentric relation and each electrode comprising an anode and a cathode plate, a frangible ampoule mounted in the smaller diameter chamber and extending into the aforesaid larger diameter chamber, an electrolyte in the ampoule, and electrode mounted within the secondary chamber, and means for conducting said electrolyte under the influence of centrifugal force from the larger diameter chamber into the secondary chamber when liberated into the former from the ampoule.

3. A battery subject to setback and centrifugal forces, comprising a casing, an insulating closed form fitted therein, said form defining two communicating chambers of unequal diametrical dimensions and having a transverse wall intermediate the ends of the form, the walls of the smaller diameter chamber, the larger diameter chamber and the casing defining a secondary chamber, which is of annular shape, an electrode in said secondary chamber, electrodes mounted radially in the larger diameter chamber, each electrode comprising an anode and a cathode plate, a frangible ampoule mounted in the smaller diameter chamber and extending into the aforesaid larger diameter chamber, an electrolyte in the ampoule, and an electrode mounted in the secondary chamber, said transverse wall having a series of bores providing a means for distributing the electrolyte under the influence of centrifugal force between the larger diameter chamber and the secondary chamber, each bore being intermediate adjacent radially mounted electrodes.

4. A battery subject to setback and centrifugal forces, comprising a casing, an insulating form of dual diametrical dimensions defining two communicating chambers correspondingly of different diameters, and with an intermediate wall substantially perpendicular to the axis of said form, said wall surrounding the smaller diameter chamber and forming an end wall of the larger diameter chamber, said form being fitted into the casing and partly defining a secondary chamber between the wall of the casing and the wall of the smaller diameter chamber, electrodes radially mounted in the larger diameter chamber of said form, the inner and outer ends of the electrodes being disposed in substantially concentric relation and each electrode comprising an anode and a cathode plate, a frangible ampoule mounted in the smaller diameter chamber and extending into the aforesaid larger diameter chamber, an electrolyte in the ampoule, and an electrode mounted in the secondary chamber, said perpendicular wall having a series of bores equi-distant from said axis and each disposed intermediately of adjacent radially mounted electrodes for distributing and leveling of said electrolyte under the influence of centrifugal force, when said electrolyte is liberated.

5. A battery subject to setback and centrifugal forces, comprising a casing, an insulating form of dual diametrical dimensions defining two communicating closed chambers correspondingly of different diameters, and having a wall intermediate of the chambers, said wall surrounding the smaller diameter chamber and forming an end wall of the larger diameter chamber, said wall being perpendicular to the axis of said casing when fitted into the casing and partly defining a secondary chamber between the wall of the casing and the wall of the smaller diameter chamber, said intermediate wall having a series of bores equi-distant from the battery axis, a frangible ampoule an electrolyte in said ampoule for occupying the chambers and adapted to flow in part through the bores into the secondary chamber under the influence of centrifugal force, electrodes mounted radially within the larger diameter and extending inwardly and beyond said bores, their inner ends being concentric with the battery axis, the electrodes being operable to confine and isolate said electrolyte within each cell upon complete distribution of the electrolyte, and an electrode in the secondary chamber.

6. In a battery, a casing, an insulating form located in the casing and defining dual segmental chambers, said chambers diametrally opposing each other and extending longitudinally of said form and openly confronting an axial chamber in the form, the casing and form defining secondary chambers formed intermediately of the segmental chambers, an electrode in said secondary chamber, electrodes disposed coaxially within said segmental chambers, said form having a longitudinal series of bores providing communication between the segmental and secondary chambers, electrodes within the secondary chambers, a frangible ampoule occupying the axial chamber, and an electrolyte in the ampoule.

7. A battery comprising a casing, an insulating form in the casing, the form defining an axial chamber and a cell chamber offset radially from the axial chamber, one of said cell chambers communicating directly with the axial chamber the form and the casing defining a secondary chamber having communication with the first cell chamber radially inwardly from the outer wall of the cell chamber, the form including partition means disposed radially outwardly of said last communication for blocking access between the cell and secondary chambers, electrodes in the cell and secondary chambers, a frangible ampoule in the axial chamber, and an electrolyte in the ampoule which upon breaking of the ampoule is distributed under centrifugal force into the cell chamber between the outer wall thereof and said last communication, the last communication conducting overflow electrolyte under centrifugal force from the cell chamber into the secondary chamber.

8. A battery comprising a casing, an insulating form in the casing, the form defining an axial chamber and an annular cell chamber, the casing and form defining a secondary chamber, said cell and secondary chambers surrounding the axial chamber and separated from each other by a transverse partition of the form, said cell chamber communicating directly with the axial chamber, and the secondary chamber having communication with the cell chamber through said partition and radially inwardly from the outer wall of the cell chamber, electrodes in the cell and secondary chambers, a frangible ampoule in the axial chamber, and an electrolyte in the ampoule which upon breaking of the ampoule is distributed under centrifugal force into the cell chamber between the outer wall thereof and said last communication, the last communication conducting overflow electrolyte under centrifugal force from the cell chamber into the secondary chamber.

9. A battery comprising a casing, an insulating form in the casing, the form defining an axial chamber and a pair of diametrically opposed cell chambers surrounding the axial chamber, said pair of diametrically opposed cell chambers communicating directly with the axial chamber and being disposed between the second pair of opposed chambers and separated therefrom by longitudinal partitions of the form, the casing and form defining a pair of opposed secondary chambers, pair of opposed secondary chambers being separated directly from the axial chamber by said form and having communications with said pair of cell chambers through said partitions and radially inwardly from the outer walls of said pair of cell chambers, electrodes in the cell chambers and in the secondary chambers, a frangible ampoule in the axial chamber, and an electrolyte in the ampoule which upon breaking of the ampoule is distributed under centrifugal force into said pair of cell chambers between the outer walls thereof and said last communications, the last communications conducting overflow electrolyte under centrifugal force from the cell chambers into the secondary chambers.

10. A battery subject to set-back and centrifugal forces, comprising a casing, an insulating form located in said casing and having at least two communicating chambers, said form defining at least one secondary chamber with said casing, said secondary chamber being separate from said communicating chambers, a frangible ampoule in one of said communicating chambers, an electrolyte in said ampoule, electrodes disposed in said secondary chamber and the other of said communicating chambers, and means in said form for conducting a portion of said electrolyte under the influence of centrifugal force from said communicating chambers into said secondary chamber.

References Cited in the file of this patent

UNITED STATES PATENTS

| | | |
|---|---|---|
| 1,359,201 | Sheahan | Nov. 16, 1920 |
| 1,509,209 | Huntley | Sept. 23, 1924 |
| 2,147,116 | Winckler | Feb. 14, 1939 |
| 2,403,567 | Wales | July 9, 1946 |

FOREIGN PATENTS

| | | |
|---|---|---|
| 167,615 | Great Britain | Aug. 18, 1921 |